United States Patent

May

[11] Patent Number: 5,890,727
[45] Date of Patent: Apr. 6, 1999

[54] TRAILER HITCH ASSEMBLY

[76] Inventor: Gregory B. May, 215 E. 150 South, Knox, Ind. 46534

[21] Appl. No.: 853,087

[22] Filed: May 8, 1997

[51] Int. Cl.$^6$ .................................................. B60D 1/06
[52] U.S. Cl. ........................................ 280/416.1; 280/511
[58] Field of Search .............................. 280/415.1, 416.1, 280/477, 478.1, 491.1, 504, 511

[56] References Cited

U.S. PATENT DOCUMENTS

| | | | |
|---|---|---|---|
| 3,792,877 | 2/1974 | Martin | 280/416.1 |
| 3,801,134 | 4/1974 | Dees | 280/416.1 |
| 3,922,006 | 11/1975 | Borges | 280/416.1 |
| 4,200,306 | 4/1980 | Helms | 280/494 |
| 4,232,877 | 11/1980 | Milton | 280/415 |
| 4,729,571 | 3/1988 | Tienstra | 280/416.1 |
| 5,044,652 | 9/1991 | Brisson | 280/416.1 |
| 5,106,114 | 4/1992 | Haupt | 280/416.1 |
| 5,211,416 | 5/1993 | Blacklaw | 280/416.1 |
| 5,351,982 | 10/1994 | Walrath | 280/416.1 |
| 5,702,118 | 12/1997 | Hanson et al. | 280/416.1 |
| 5,725,229 | 3/1998 | McWethy | 280/416.1 |

*Primary Examiner*—J. J. Swann
*Assistant Examiner*—Avraham H. Lerner
*Attorney, Agent, or Firm*—Joseph N. Breaux

[57] ABSTRACT

A trailer hitch assembly that includes a hitch mount member having a chassis mount plate, a hitch mount plate having a plate mounting aperture bored entirely therethrough and four spaced alignment bores formed therein, and an extension arm in connection between the chassis mount plate and the hitch mount plate; a multi-ball hitch unit including a cross-shaped ball support structure including four support arms extending radially outward from a center portion having a structure mounting aperture formed therethrough; three trailer mount balls, each secured to the end of one of the four support arms; and a pintel hook secured to the end of the remaining one of the four support arms; and a positioning mechanism including a bolt assembly including a bolt having a cap portion and a threaded shaft portion; a securing nut threadable onto an end of the threaded shaft portion; a biasing spring; and two alignment pins, the alignment pins extending perpendicularly with respect to two of the four support arms and being positioned in a manner such that when the plate mounting aperture and the structure mounting aperture are in alignment the alignment pins are positionable in registration with two of the four spaced alignment bores, the biasing spring being positioned between the mounting plate and the support structure, the threaded portion of the bolt being positioned through the plate mounting aperture and the structure mounting aperture, the securing nut being threaded onto an end of the threaded shaft portion.

20 Claims, 2 Drawing Sheets

TRAILER HITCH ASSEMBLY

TECHNICAL FIELD

The present invention relates to trailer hitch assemblies and more particularly to a trailer hitch assembly including a hitch mount member having a chassis mount plate, a hitch mount plate having a plate mounting aperture bored entirely therethrough and four spaced alignment bores formed therein, and an extension arm in connection between the chassis mount plate and the hitch mount plate; a multi-ball hitch unit including a cross-shaped ball support structure including four support arms extending radially outward from a center portion that has a structure mounting aperture formed therethrough; three trailer mount balls, each secured to the end of one of the four support arms; and a pintel hook secured to the end of the remaining one of the four support arms; and a positioning mechanism including a bolt assembly including a bolt having a cap portion and a threaded shaft portion; a securing nut threadable onto an end of the threaded shaft portion; a biasing spring; and two) alignment pins, the alignment pins extending perpendicularly with respect to two of the four support arms and being positioned in a manner such that, when the plate mounting aperture and the structure mounting aperture are in alignment, the alignment pins are positionable in registration with two of the four spaced alignment bores, the biasing spring being positioned between the mounting plate and the support structure, the threaded portion of the bolt being positioned through the plate mounting aperture, the biasing spring and the structure mounting aperture, the securing nut being threaded onto an end of the threaded shaft portion.

BACKGROUND OF THE INVENTION

Trailers are typically provided with one of a number of standard trailer hitch fittings. Because at various time a vehicle can be required to tow a number of trailers, each equipped with different trailer hitch fitting, it would be a benefit to have a trailer hitch assembly that could be used to attach trailers equipped with different hitch fittings to a vehicle. Because convenience is always a benefit, it would of course also be a benefit to have a trailer hitch assembly that could be easily converted to connect with a required type of trailer hitch fitting.

SUMMARY OF THE INVENTION

It is thus an object of the invention to provide a trailer hitch assembly.

It is a further object of the invention to provide a trailer hitch assembly that includes multiple hitch connectors that can be used to attach trailers equipped with different hitch fittings to a vehicle.

It is a still further object of the invention to provide a trailer hitch assembly that includes multiple hitch connectors that can be easily converted to connect with one of a predetermined number of trailer hitch fittings used to attach a trailer to a vehicle.

It is a still further object of the invention to provide a trailer hitch assembly that includes a hitch mount member having a chassis mount plate, a hitch mount plate having a plate mounting aperture bored entirely therethrough and four spaced alignment bores formed therein, and an extension arm in connection between the chassis mount, plate and the hitch mount plate; a multi-ball hitch unit including a cross-shaped ball support structure including four support arms extending radially outward from a center portion having a structure mounting aperture formed therethrough; three trailer mount balls, each secured to the end of one of the four support arms; and a pintel hook secured to the end of the remaining one of the four support arms; and a positioning mechanism including a bolt, assembly including a bolt having a cap portion and a threaded shaft portion; a securing nut threadable onto an end of the threaded shaft portion; a biasing spring; and two alignment pins, the alignment pins extending perpendicularly with respect to two of the four support arms and being positioned in a manner such that, when the plate mounting aperture and the structure mounting aperture are in alignment, the alignment pins are positionable in registration with two of the four spaced alignment bores, the biasing spring being positioned between the mounting plate and the support structure, the threaded portion of the bolt being positioned through the plate mounting aperture, the biasing spring and the structure mounting aperture, the securing nut being threaded onto an end of the threaded shaft portion.

It is a still further object of the invention to provide a trailer hitch assembly that accomplishes some or all of the above objects in combination.

Accordingly, a trailer hitch assembly is provided. The trailer hitch assembly includes a hitch mount member having a chassis mount plate, a hitch mount plate having a plate mounting aperture bored entirely therethrough and four spaced alignment bores formed therein, and an extension arm in connection between the chassis mount plate and the hitch mount plate; a multi-ball hitch unit including a cross-shaped ball support structure including four support arms extending radially outward from a center portion having a structure mounting aperture formed therethrough three trailer mount balls, each secured to the end of one of the four support arms; and a pintel hook secured to the end of the remaining one of the four support arms; and a positioning mechanism including a bolt assembly including a bolt having a cap portion and a threaded shaft portion; a securing nut threadable onto an end of the threaded shaft portion; a biasing spring; and two alignment pins, the alignment pins extending perpendicularly with respect to two of the four support arms and being positioned in a manner such that, when the plate mounting aperture and the structure mounting aperture are in alignment, the alignment pins are positionable in registration with two of the four spaced alignment bores, the biasing spring being positioned between the mounting plate and the support structure, the threaded portion of the bolt being positioned through the plate mounting aperture, the biasing spring and the structure mounting aperture, the securing nut being threaded onto an end of the threaded shaft portion. In a preferred embodiment the trailer mount balls are integrally formed at the ends of three of the four support arms.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
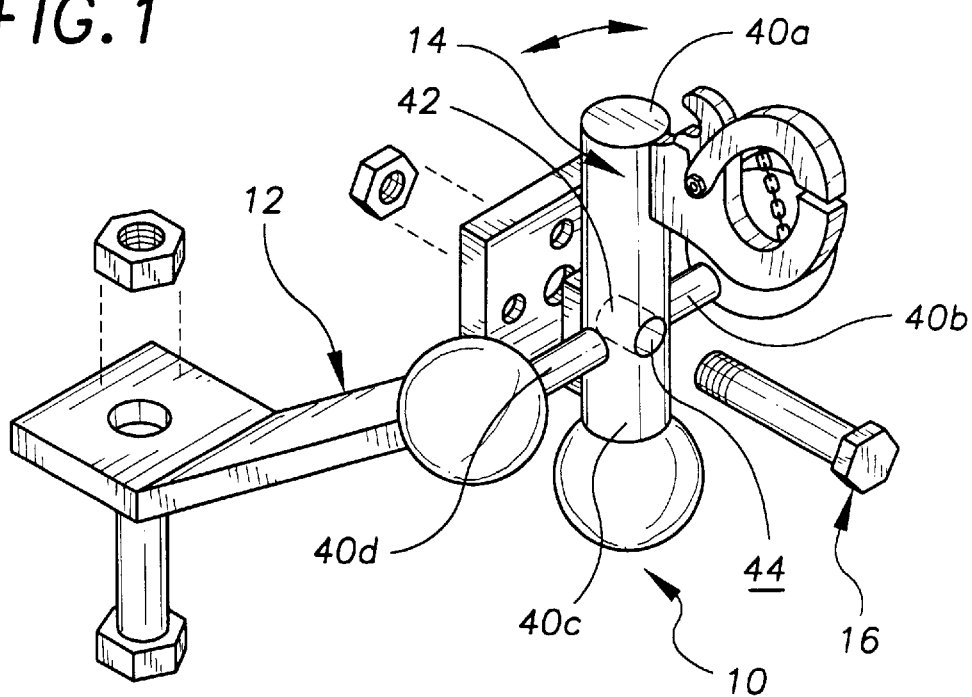
FIG. 1 is a frontal perspective view of the trailer hitch assembly of the present invention showing the hitch mount member, the rotatably positionable multi-ball hitch unit and the positioning mechanism.

FIG. 1 shows an exemplary embodiment of the trailer hitch assembly of the present invention generally designated by the numeral 10. Trailer hitch assembly 10 includes a hitch mount member, generally designated by the numeral 12; a rotatably positionable multi-ball hitch unit, generally designated by the numeral 14; and a positioning mechanism, generally designated by the numeral 16.

Figure 2:
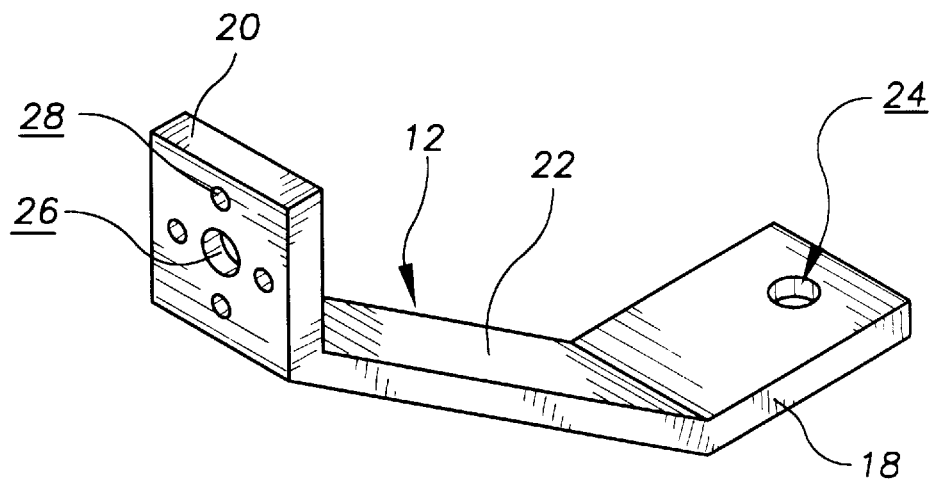
FIG. 2 is a perspective view of the hitch mount member in isolation showing the chassis mount plate, the extension arm, and the hitch mount plate.

With reference now to FIG. 2, hitch mount member 12 is constructed from a length of stainless steel bar stock that has been bent to form a chassis mount plate 18, a hitch mount plate 20, and an extension arm 22. Chassis mount plate 18 has a chassis mount aperture 24 formed therethrough that is used in conjunction with a fastening mechanism such as a nut and bolt combination to secure hitch mount member 12 to the frame or chassis of a vehicle. Hitch mount plate 20 has a plate mounting aperture 26 bored entirely through the center thereof and four alignment bores 28 drilled into hitch mount plate 20 and spaced at ninety degree intervals about the centrally located plate mounting aperture 26. In this embodiment, alignment bores 28 are blind bores that extend about one-third of an inch into hitch mount plate 20.

Figure 3:
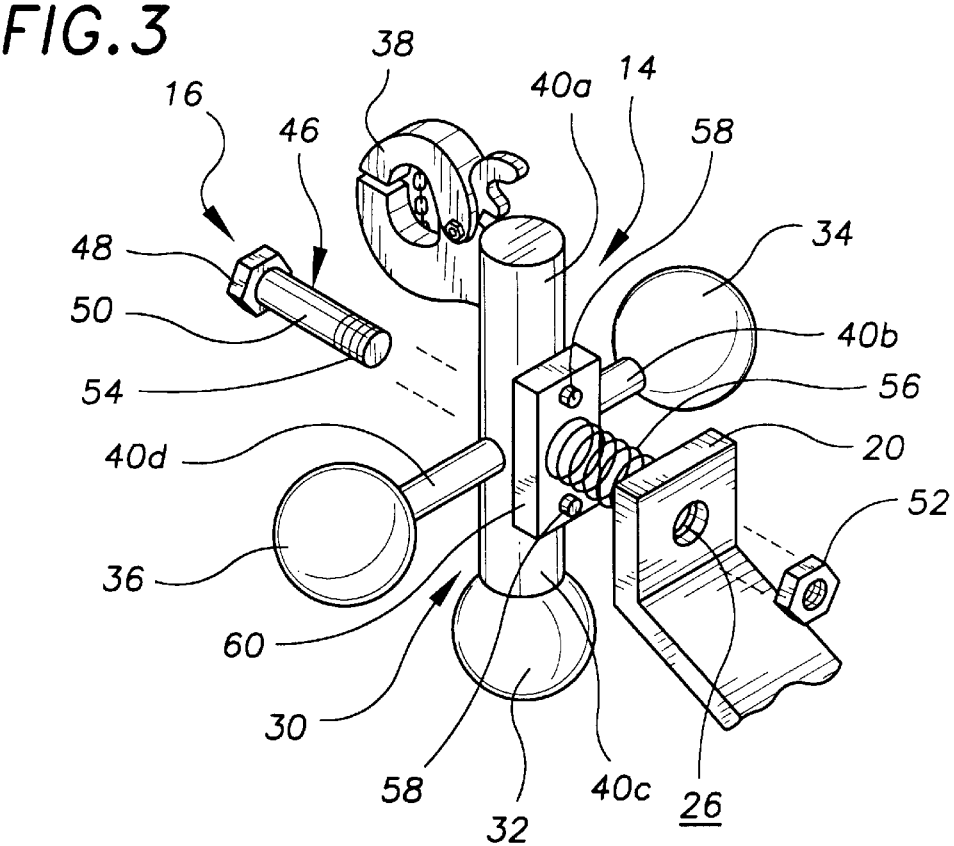
FIG. 3 is a partial rear perspective view showing the hitch mount plate of the hitch mount member and the rotatably positionable multi-ball hitch unit with the securing bolt partially exploded away and the biasing spring positioned between the hitch mount plate of the hitch mount member and the cross-shaped ball support structure of the rotatably positionable multi-ball hitch unit.

With reference to FIG. 3, multi-ball hitch unit 14 includes a cross-shaped ball support structure, generally designated 30; a first trailer mount, ball 32; a second trailer mount ball 34; a third trailer mount ball 36; and a pintel hook assembly 38. In this embodiment, first, second and third trailer mount, balls 32,34,36 and cross-shaped ball support structure 30 are integrally formed from die cast stainless steel. First trailer mount ball 32 has a diameter of one and seven-eighths inches. Second trailer mount ball 34 has a diameter of two inches. Third trailer mount ball 36 has a diameter of two and five-sixteenths inches. Pintel hook assembly 38 is a conventional pintel hook assembly that is constructed from stainless steel and is welded to the end of one of four support arms 40a–d that form cross-shaped ball support structure 30. With reference back to FIG. 1, support arms 40a–d intersect in a center portion 4 that has a structure mounting aperture 44 drilled entirely therethrough.

Referring back to FIG. 2, positioning mechanism 16 includes a bolt assembly including a bolt 46 having a cap portion 48 and a threaded shaft portion 50; a securing nut 52 threadable onto an end 54 of threaded shaft portion 50; a biasing spring 56; and two alignment, pins 58 that extend perpendicularly with respect to an alignment pin plate 60 that is integrally formed with two support arms 40a,40c. Alignment pins 58 are sized to fit within alignment bores 28 (FIG. 2) and positioned in a manner such that they are simultaneously positionable in registration with two of the four spaced alignment bores 28.

Biasing spring 56 is a conventional compression spring that is positioned between hitch mounting plate 20 and cross-shaped ball support structure 30 to bias cross-shaped ball support structure 30 away from hitch mounting plate 20.

During assembly, threaded shaft 50 of bolt 46 is positioned through structure mounting aperture 44, biasing spring 56 and plate mounting aperture 26 (FIG. 1) and securing nut 52 is then threaded onto end 54 of threaded shaft portion 50. Tightening securing nut 52 maintains alignment pins 58 within two of the four alignment bores 28 and prevents cross-shaped ball support structure 30 from rotating about bolt 46 during use.

Figure 4:
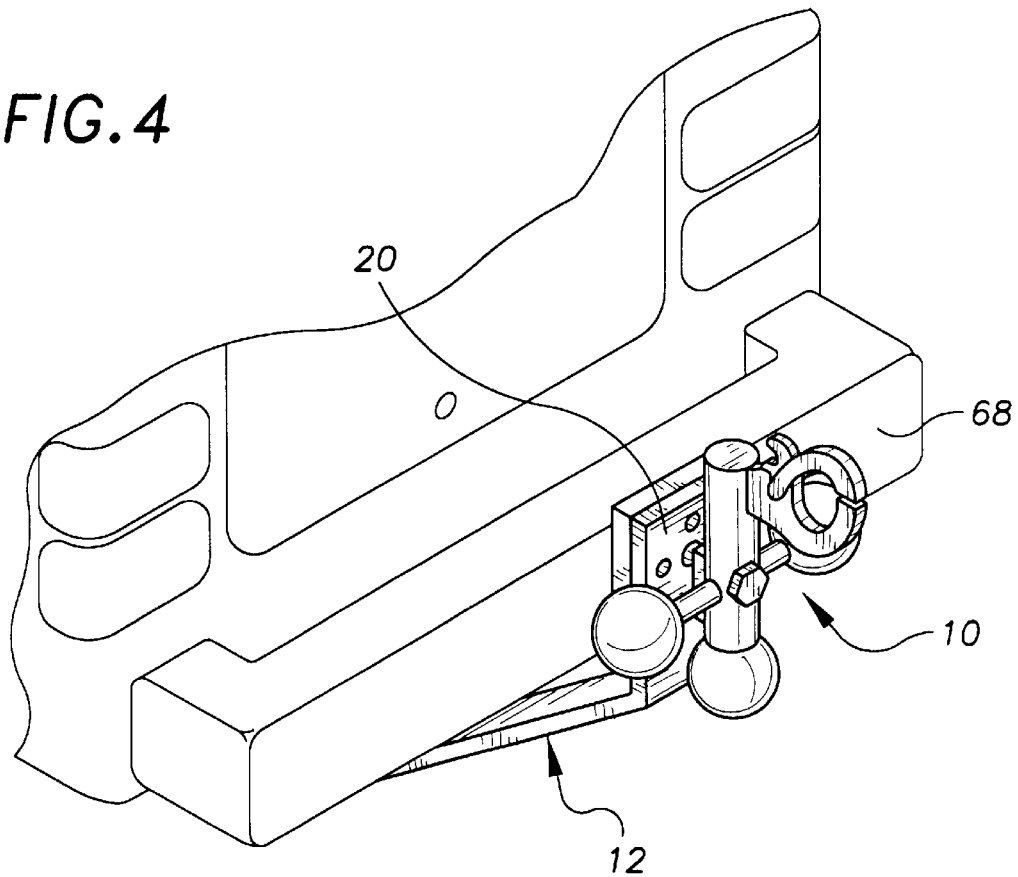
FIG. 4 is a perspective view of the exemplary tailer hitch assembly of FIG. 1 installed under a representative bumper unit of a representative vehicle.

With reference to FIG. 4, trailer hitch assembly 10 is installed by bolting or otherwise securing chassis mounting plate 18 (FIG. 2) of hitch mounting member 12 to the frame or chassis of a vehicle in a manner such that hitch mounting plate 20 extents to the rear of the vehicle bumper 68. Continuing with general reference to FIGS. 1–4, once hitch mounting member 12 is secured to the vehicle, trailer hitch assembly 10 is used by identifying which of the towing connectors is needed for a particular trailer, (first, second or third trailer mount balls 32,34,36 or the pintel hook 38); positioning the required towing connector in an operational position by loosening bolt 46 to the point where biasing spring 56 forces cross-shaped ball support structure 30 away from mounting plate 20 a sufficient distance to pull alignment pins 58 free from alignment bores 28, rotating cross-shaped ball support structure 30 until the required towing connecter is positioned uppermost with respect to the other towing connectors and the two alignment pins 58 are in registration with two of the four alignment bores 28, and then tightening bolt 46 sufficiently to force alignment pins 58 into two alignment bores 28. It can be seen that the inclusion of biasing spring 56 in positioning mechanism 16 provides a marked increase in the ease with which trailer hitch assembly 10 is configured for a particular trailer by eliminating the need for the user to pull cross-shaped ball support structure 30 away from hitch mounting plate 20 during the configuring process.

It can be seen from the preceding description that a trailer hitch assembly has been provided that includes multiple hatch connectors that can be used to attach trailers equipped with different hitch fittings to a vehicle; that can be easily converted to connect with one of a predetermined number of trailer hitch fittings used to attach a trailer to a vehicle; and that includes a hitch mount member having a chassis mount plate, a hitch mount plate having a plate mounting aperture bored entirely therethrough and four spaced alignment bores formed therein, and an extension arm in connection between the chassis mount plate and the hitch mount plate; a multi-ball hitch unit including a cross-shaped ball support structure including four support arms extending radially outward from a center portion having a structure mounting aperture formed therethrough; three trailer mount balls, each secured to the end of one of the four support arms; and a pintel hook secured to the end of the remaining one of the four support arms; and a positioning mechanism including a bolt assembly including a bolt having a cap portion and a threaded shaft portion; a securing nut threadable onto an end of the threaded shaft portion; a biasing spring; and two alignment pins, the alignment pins extending perpendicularly with respect to two of the four support arms and being positioned in a manner such that when the plate mounting aperture and the structure mounting aperture are in alignment the alignment pins are positionable in registration with two of the four spaced alignment bores, the biasing spring being positioned between the mounting plate and the support structure, the threaded portion of the bolt being positioned through the plate mounting aperture and the structure mounting aperture, the securing nut being threaded onto an end of the threaded shaft portion.

It is noted that the embodiment of the trailer hitch assembly described herein in detail for exemplary purposes is of course subject to many different variations in structure, design, application and methodology. Because many varying and different embodiments may be made within the scope of the inventive concept(s) and because many modifications may be made in the embodiment herein detailed in accordance with the descriptive requirements of the law, it is to be understood that the details herein are to be interpreted as illustrative and not in a limiting sense.

What is claimed is:

1. A trailer hitch assembly comprising:

a hitch mount member having a chassis mount plate, a hitch mount plate having a plate mounting aperture bored entirely therethrough and four spaced alignment bores formed therein, and an extension arm in connection between said chassis mount plate and said hitch mount plate;

a multi-ball hitch unit including a cross-shaped ball support structure including four support arms extending radially outward from a center portion having a structure mounting aperture formed therethrough; three trailer mount balls, each secured to an end of one of said four support arms; and a pintel hook secured to an end of a remaining one of said four support arms; and a positioning mechanism including a bolt assembly including a bolt having a cap portion and a threaded shaft portion, and a securing nut threadable onto an end of said threaded shaft portion; a biasing spring; and two alignment pins;

said two alignment pins extending perpendicularly with respect to two of said four support arms and being positioned in a manner such that when said plate mounting aperture and said structure mounting aperture are in alignment said a alignment pins are positionable in registration with two of said four spaced alignment bores, said biasing spring being positioned between said mounting plate and said support structure, said threaded portion of said bolt being positioned through said plate mounting aperture and said structure mounting aperture, said securing nut being threaded onto an end of said threaded shaft portion.

2. The trailer hitch assembly of claim 1, wherein:

said hitch mount member is constructed from a length of steel bar stock that has been bent to form said chassis mount plate, said hitch mount plate, and said extension arm.

3. The trailer hitch assembly of claim 1, wherein:

said chassis mount plate has a chassis mount aperture formed therethrough.

4. The trailer hitch assembly of claim 1 wherein:

said four alignment bores are drilled into said hitch mount plate and spaced at ninety degree intervals about said plate mounting aperture.

5. The trailer hitch assembly of claim 4 wherein:

said four alignment bores are blind bores that extend about one-third of an inch into said hitch mount plate.

6. The trailer hitch assembly of claim 1 wherein:

said three trailer mount balls and said cross-shaped ball support structure are integrally formed.

7. The trailer hitch assembly of claim 1 wherein:

said two alignment pins extend perpendicularly with respect to an alignment pin plate that is integrally formed with two of said four support arms.

8. The trailer hitch assembly of claim 2, wherein:

said chassis mount plate has a chassis mount aperture formed therethrough.

9. The trailer hitch assembly of claim 2 wherein:

said four alignment bores are drilled into said hitch mount plate and spaced at ninety degree intervals about said plate mounting aperture.

10. The trailer hitch assembly of claim 9 wherein:

said four alignment bores are blind bores that extend about one-third of an inch into said hitch mount plate.

11. The trailer hitch assembly of claim 2 wherein:

said three trailer mount balls and said cross-shaped ball support structure are integrally formed.

12. The trailer hitch assembly of claim 2 wherein:

said two alignment pins extend perpendicularly with respect to an alignment pin plate that is integrally formed with two of said four support arms.

13. The trailer hitch assembly of claim 8, wherein:

said four alignment bores are drilled into said hitch mount plate and spaced at ninety degree intervals about said plate mounting aperture.

14. The trailer hitch assembly of claim 13 wherein:

said four alignment bores are blind bores that extend about one-third of an inch into said hitch mount plate.

15. The trailer hitch assembly of claim 13 wherein:

said three trailer mount balls and said cross-shaped ball support structure are integrally formed.

16. The trailer hitch assembly of claim 15 wherein:

said two alignment pins extend perpendicularly with respect to an alignment pin plate that is integrally formed with two of said four support arms.

17. The trailer hitch assembly of claim 14 wherein:

said three trailer mount balls and said cross-shaped ball support structure are integrally formed.

18. The trailer hitch assembly of claim 17 wherein:

said two alignment pins extend perpendicularly with respect to an alignment pin plate that is integrally formed with two of said four support arms.

19. The trailer hitch assembly of claim 3 wherein:

said three trailer mount balls and said cross-shaped ball support structure are integrally formed.

20. The trailer hitch assembly of claim 3 wherein:

said two alignment pins extend perpendicularly with respect to an alignment pin plate that is integrally formed with two of said four support arms.

* * * * *